US006763768B2

(12) United States Patent
Hart et al.

(10) Patent No.: US 6,763,768 B2
(45) Date of Patent: Jul. 20, 2004

(54) RAMP LATCHING MECHANISM

(75) Inventors: James E. Hart, Trafford, PA (US);
Gary M. Sich, Irwin, PA (US); John B. Carroll, Irwin, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/325,804

(22) Filed: Dec. 19, 2002

(65) Prior Publication Data

US 2004/0118314 A1 Jun. 24, 2004

(51) Int. Cl.[7] .............................................. B61C 17/04
(52) U.S. Cl. ....................... 105/458; 105/425; 296/57.1
(58) Field of Search ................... 105/427, 429, 105/432, 435, 458, 450, 425, 308.1, 308.2, 313; 104/7.3; 296/61, 57.1; 292/201, 216, DIG. 23, DIG. 24; 414/557; 49/394; 16/231

(56) References Cited

U.S. PATENT DOCUMENTS

| | | | | |
|---|---|---|---|---|
| 3,180,281 A | * | 4/1965 | Sherrie et al. ................. 410/78 |
| 3,323,472 A | * | 6/1967 | Boone et al. ................ 105/458 |
| 3,370,552 A | * | 2/1968 | De Podesta et al. ........... 410/10 |
| 3,795,333 A | * | 3/1974 | Tebben ........................ 414/537 |
| 5,535,681 A | * | 7/1996 | Sarnicki et al. ............. 105/458 |
| 5,707,095 A | * | 1/1998 | Pribak et al. ............... 296/57.1 |
| 5,727,473 A | * | 3/1998 | Engle .......................... 105/355 |
| 6,247,732 B1 | * | 6/2001 | Alton .......................... 292/216 |
| 6,378,920 B1 | * | 4/2002 | Ostrowski et al. .......... 292/216 |
| 6,422,615 B1 | * | 7/2002 | Roos et al. .................. 292/216 |
| 6,540,272 B2 | * | 4/2003 | Spurr .......................... 292/216 |

* cited by examiner

Primary Examiner—Frantz F. Jules
(74) Attorney, Agent, or Firm—James Ray & Associates

(57) ABSTRACT

A latching mechanism for use with a raisable and lowerable folding ramp having a bridge section and a toe section, such ramp being carried on one end of a railway car. The latching mechanism comprises an arm-like member pivotally connected at one end thereof to a predetermined structure of such railway car and a latch means attached to and extending outwardly from one of the bridge section and toe section of such folding ramp. A latching head portion is disposed at a radially opposed end of such arm-like member, and the latching head portion including a means for securing the latch means. A rotatable latching member is disposed in the latching head portion to engage and lock such latch means when such folding ramp reaches a fully raised position.

21 Claims, 2 Drawing Sheets

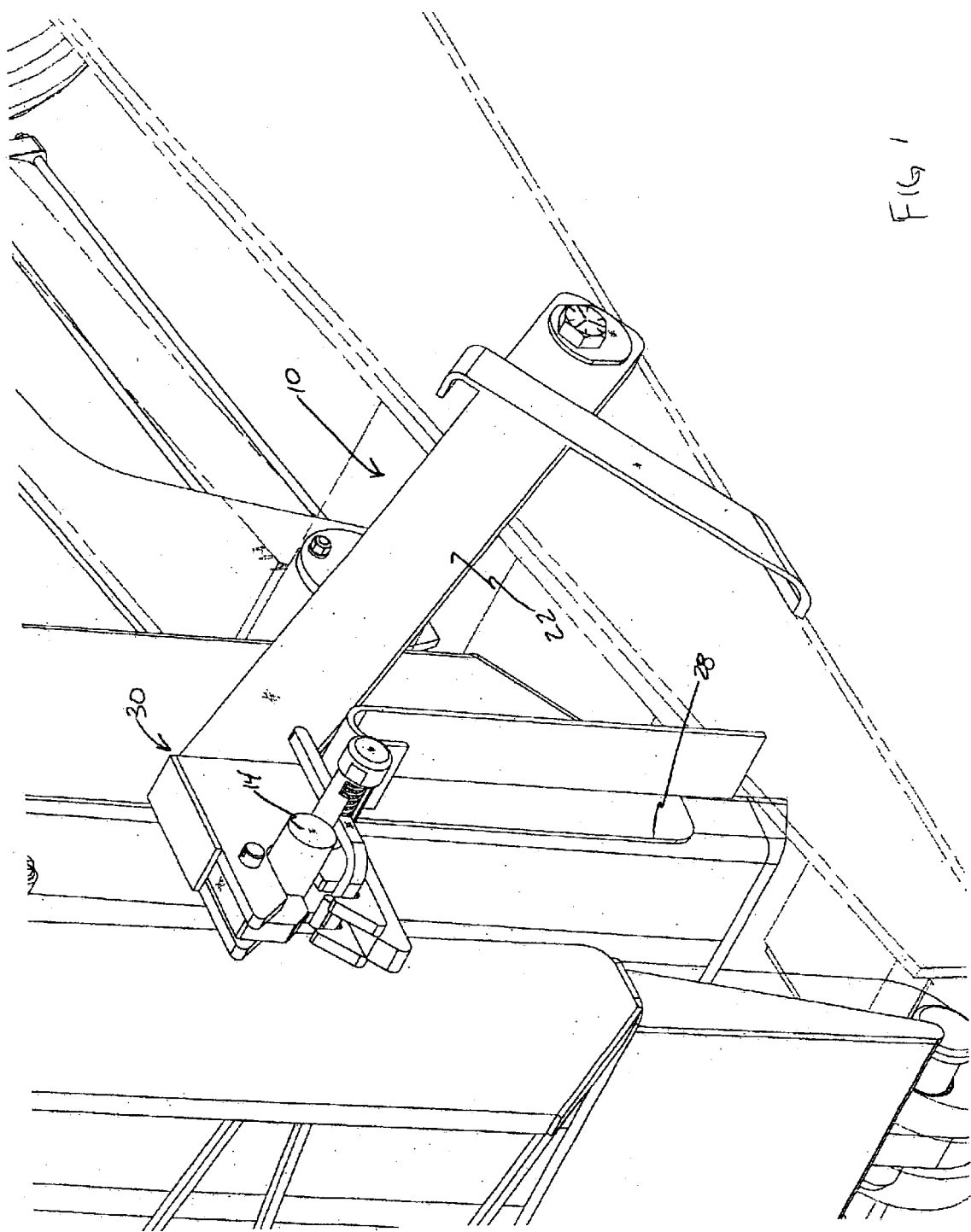

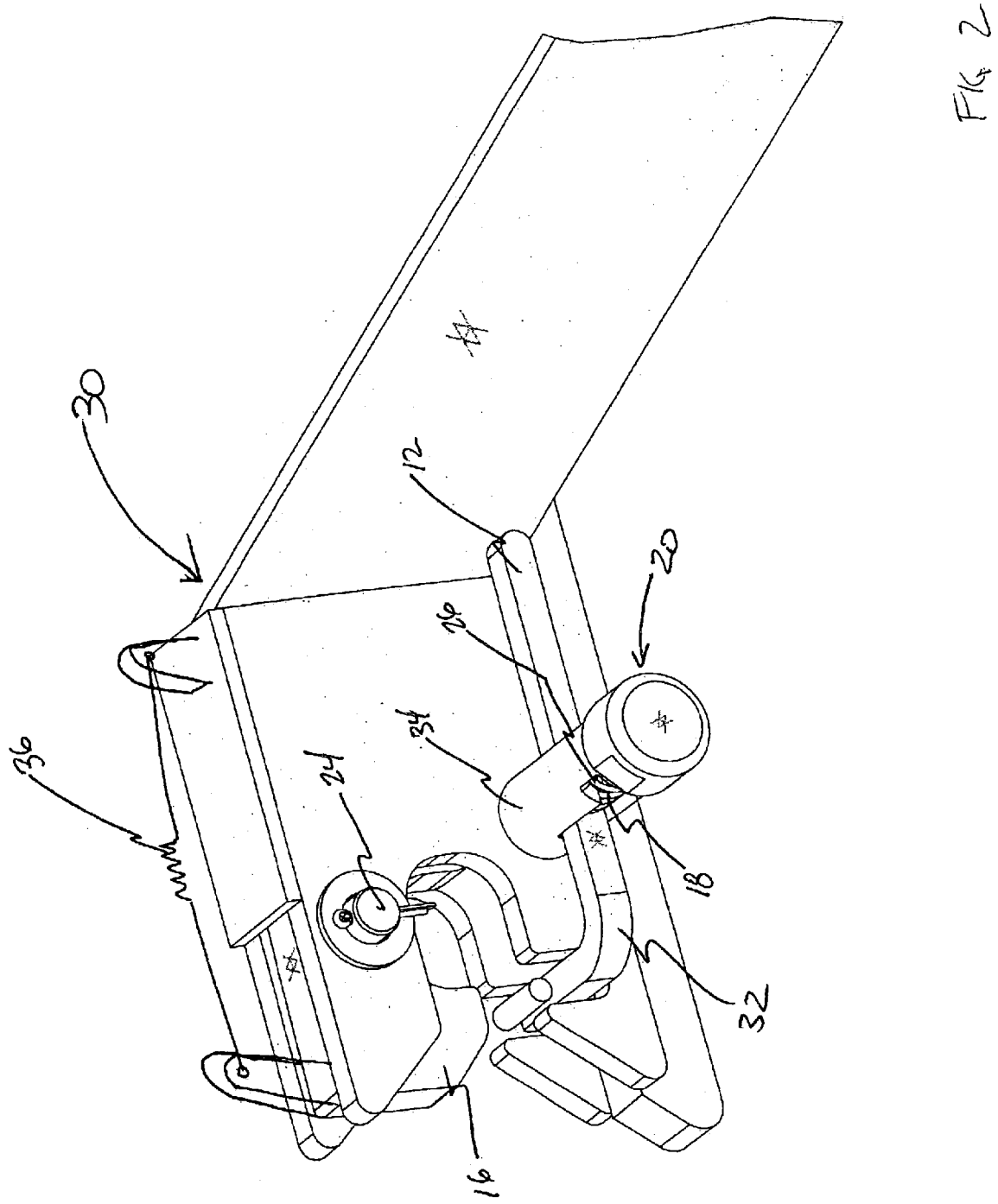

RAMP LATCHING MECHANISM

FIELD OF THE INVENTION

The present invention generally relates to a folding ramp carried on the end of a platform railcar for loading and unloading trailers. More particularly, the invention relates to an automatically engaged, manually released safety latch to secure the folding ramp in a raised and stored position for train operation.

BACKGROUND OF THE INVENTION

Railroad cars are often used to transport highway trailers. One method of loading highway trailers or other wheeled vehicles onto railroad cars having decks for carrying vehicles is by what is called circus loading. A ramp is placed at one end of a string of rail car units, and then each vehicle is loaded in sequence by driving them up the ramp and along the decks of the railroad car units. Bridge plates typically span the gaps between successive rail car units. Although circus loading is common for a string of cars, such end-loading can be used for individual rail car units, or multiple rail car units as may be convenient.

It is common for portable ramps to be employed to permit trailers to be driven up onto the rail cars. In recent years there has been an emphasis on reducing the loading time required in intermodal train service, and in increasing the length of intermodal trains. Another trend has been toward the increased use of articulated railroad cars, as opposed to single unit cars employing standard separable couplers. Articulated railroad cars are often able to carry the same number of highway trailers as coupled individual cars, but have fewer rail car trucks, thus increasing the lading per truck and reducing the effective ratio of the railcar weight to lading weight, while also reducing the slack action along the train consist in service.

When a large number of articulated cars are used, and a lengthy train is to be loaded, it is important that loading proceed in an orderly and efficient manner. The railcars are split at the separable coupler ends, ramps are moved into place, and wheeled vehicles are loaded in both directions running away from the location of the split. Once loaded, the train is re-assembled by re-joining the coupler ends, and the train departs the loading terminal.

The loading of highway trailers has certain special features. First, the highway trailers are backed into position sequentially using a hostler truck, or tractor. Backing a highway trailer on a flat car is a task requiring some care. It is advantageous to align the loading ramp well before commencing loading of the trailers. At present, time is often wasted aligning the ramps. It would be highly advantageous to have a ramp that can be aligned relatively quickly and easily.

Another method of loading highway trailers onto railcars is by use of large overhead cranes, which pick the trailers up and place them into position for transport on the railcar decks. This requires very large and expensive equipment, however, and can be done only with reinforced trailers. A large portion of existing highway trailers cannot be handled in this manner.

SUMMARY OF THE INVENTION

In one aspect, the invention generally features a latching mechanism for use with a raisable and lowerable folding ramp having a bridge section and a toe section, such ramp being carried on one end of a railway car. The latching mechanism comprises an arm-like member pivotally connected at one end thereof to a predetermined structure of such railway car and a latch means attached to and extending outwardly from one of the bridge section and toe section of such folding ramp. A latching head portion is disposed at a radially opposed end of such arm-like member, and the latching head portion including a means for securing the latch means. A rotatable latching member is disposed in the latching head portion to engage and lock such latch means when such folding ramp reaches a fully raised position.

OBJECTS OF THE INVENTION

It is therefore the primary object of the present invention to provide a safety latch to secure the folding ramp of a railcar in the raised and stored position for proper and safe train operation.

Another object of this invention is to provide a safety latch to secure the folding ramp of a railcar in the raised and stored position, which can be automatically engaged into the locked position.

It is still another object of this invention to provide a safety latch to secure the folding ramp of a railcar in the raised and stored position which can be only manually released from the locked position, and then readies itself to be automatically engaged into the locked position.

A further object of this invention is to provide a safety latch to secure the folding ramp of a railcar in the raised and stored position, which is able to automatically reset the latching mechanism into the locked position when it has been momentarily released.

In addition to the above-described objects and advantages of the ramp latching mechanism of this invention, various other objects and advantages of the present invention will become more readily apparent to the persons who are skilled in the same and related arts from the following more detailed description of the invention, particularly, when such description is taken in conjunction with the attached drawing figures and the appended claims.

DESCRIPTION OF THE DRAWING

FIG. 1 is a perspective view of the entire latch mechanism as mounted on the ramp style railcar.

FIG. 2 is a more detailed view of the head of the latch mechanism.

DETAILED DESCRIPTION OF THE PREFERRED EMBODIMENT

It can be seen from the above discussion that it would be highly advantageous to have a foldable ramp that is permanently fixed to and carried on one end of a multi-platform railcar. Such a ramp may be raised to accommodate train operation and lowered to accommodate efficient loading. With such an arrangement, however, it is very important to assure that the ramp cannot be lowered inadvertently when it is not intended to do so.

Prior to proceeding to a much more detailed description of the present invention, it should be noted that identical components which have identical functions have been identified with identical reference numerals throughout the several views illustrated in the drawing figures for the sake of clarity and understanding of the invention.

The present invention will now be described by way of a particular preferred embodiment, reference being had to the accompanying drawing, wherein:

FIGS. 1 and 2 illustrate a presently preferred embodiment of the ramp latching mechanism of this invention, generally designated 10. The latching mechanism 10 is automatically engaged and manually released. The latching mechanism 10 secures the folding ramp of a platform railcar in the raised and stored position for train operation.

In a preferred configuration, the ramp includes a bridge section (not shown) pivotally connected on one of its ends to the rail car and a toe section (not shown) hinged to the opposing end of the bridge section to accommodate folding. Pneumatic actuators (not shown) are used in conjunction with appropriately arranged mechanical rods and levers (not shown) to raise the ramp into a generally upright and folded stored position and to lower and extend the ramp to the ground for loading trailers onto the railcar.

The ramp latching mechanism 10, has an arm 22 that is pivotally connected at its lower end to the railcar structure and carries a latching head 30 on its upper end. The latching head 30 contains a U-shaped slot, whose opening faces to the front side of the latching head 30. This slot has tapered upper and lower jaws that straddle a latching member, which in the preferred embodiment is a latch plate 16. This slot in the latching head 30 serves to guide a main latch pin 14 into the latching head 30 when these two components are being engaged. The main latch pin 14 is attached to the toe section of the ramp and is positioned to engage is the latching plate 16 that is contained in the latching head 30. The latching plate 16 has a U-shaped opening in one end, and engages the latch pin 14 when the ramp reaches its fully raised position. The latching plate 16 pivots about a fulcrum pin 24, so that it can rotate into an open position to accept the main latch pin 14. The latching plate 16 may also be urged to rotate into an open position to accept the main latch pin 14 by adding an optional tension spring 36, if needed. During both raising and lowering ramp movements, the underside of the lower jaw of the latching head 30 rests and rides on the positioning slide 28, which is carried on the side of the bridge section of the railcar ramp.

The latching head 30 also carries a locking pin assembly 20, consisting of a lock pin 18, a lock spring 26, a release handle 12, a reset arm 32 and a guide cylinder 34. When unlatched, with the ramp down, the front end of the lock pin 18 is forced by the lock spring 26 against the side of the latching plate 16. This action obstructs the lock pin 18 from passing through a receiving hole in the opposite side of the lower jaw of the latching head 30. The friction of the lock pin 18 pressing against the side of the latching plate 16 also holds the latching plate 16 in position. When the ramp is raised, the latching head 30 slides upward on the positioning slide 28, accommodated by pivoting of the arm 22, until the latching head 30 is positioned to accept the main latch pin 14. Therefore, as the railcar ramp reaches its fully raised and folded position, the main latch pin 14 on the toe of the railcar ramp enters the latching head 30 and engages the latching plate 16. The main latch pin 14 forces the latching plate 16 to rotate downward until the back of the latching plate 16 clears the lock pin 18. This allows the lock spring 26 to thrust the lock pin 18 past the latching plate 16, and into aligned holes in both sides of the lower jaw of the latching head 30. The lock pin 18 thus prevents the latching plate 16 from returning. In this locked position, the top arm of the latching plate 16 hooks around the front of the main latch pin 14, preventing it from pulling out of the latching head 30. The ramp is thereby automatically latched securely in its upright, folded position and cannot be lowered until the ramp latching mechanism 10 is manually released.

When it is desired to release the ramp latching mechanism 10 the operator pulls the release handle 12 outward, and turns it approximately 20 degrees in a clockwise direction. The release handle 12 is an extension of the reset arm 32. The reset arm 32 is perpendicular to the lock pin 18 and engages the lock pin 18 such that they move together, axially to the pin 18. During the rotation of the release handle 12, the base of the reset arm 32 slides first in an axial slot and then into a lateral notch on the wall of the guide cylinder 34, similar to a bolt-action rifle mechanism. This action pulls the lock pin 18 clear of the latching plate 16 and also causes the protruding end of the reset arm 32 to swing upward into the path of the main latch pin 14. The lock pin 18 is released at this point, and the lock spring 26 cannot force it to re-enter the locking holes because the attached reset arm 32 holds it back.

When the railcar ramp lift cylinders are pressurized to lower the railcar ramp and it begins to move, the main latch pin 14 will contact the end of the reset arm 32. With continued ramp movement this contact will rotate the reset arm 32 counterclockwise about the lock pin 18, until the base of the reset arm 32 clears the holding notch in the wall of the guide cylinder 34. Once the reset arm 32 clears the notch in the guide cylinder 34, the lock pin 18 is released. Once the lock pin 18 is released, the lock spring 26 forces the lock pin 18 against the side of the latching plate 16. The latching plate 16 has rotated forward, following the main latch pin 14. As the ramp and main latch pin 14 move further, the main latch pin 14 drives the latching plate 16 to a fully reset position as it exits the latching head 30. The latching plate 16 will remain there, held by the friction of the lock pin 18 against the side of the latching plate 16, ready for the ramp to be raised and once again engage the ramp latching mechanism 10.

While the present invention has been described by way of a detailed description of a particularly preferred embodiment, it will be readily apparent to those of ordinary skill in the art that various substitutions of equivalents may be affected without departing from the spirit or scope of the invention set forth in the appended claims.

We claim:

1. A latching mechanism for use with a raisable and lowerable folding ramp having a bridge section and a toe section, such ramp being carried on one end of a railway car, said latching mechanism comprising:
   (a) an arm-like member pivotally connected at one end thereof to a predetermined structure of such railway car;
   (b) a latch means attached to and extending outwardly from one of the bridge section and toe section of such folding ramp;
   (c) a latching head portion disposed at a radially opposed end of said arm-like member, said latching head portion including a means for securing said latch means; and
   (d) a rotatable latching member disposed in said latching head portion to engage and lock said latch means when such folding ramp reaches a fully raised position.

2. A latching mechanism, according to claim 1, wherein said means for securing said latch means in said latching head portion includes an opening.

3. A latching mechanism, according to claim 2, wherein said latch means is a latch pin carried on the toe section of the ramp.

4. A latching mechanism, according to claim 3, wherein said opening formed in said latching head portion includes a tapered lower jaw for guiding and accepting said latch pin.

5. A latching mechanism, according to claim 4, wherein said latching mechanism further includes a positioning slide disposed for engagement with a bottom surface of said tapered lower jaw of said latching head portion.

6. A latching mechanism, according to claim 4, wherein said tapered lower jaw includes at least one aperture formed therein.

7. A latching mechanism, according to claim 4, wherein said latching mechanism further includes a locking pin assembly engageable with said tapered lower jaw for locking such folding ramp in a raised position.

8. A latching mechanism, according to claim 7, wherein said locking pin assembly includes:
 (a) a locking pin, engageable at a first end thereof in said aperture formed in said tapered lower jaw;
 (b) a release means engageable with said locking pin for enabling said latch plate to rotate to a position such that such folding ramp can be lowered;
 (c) a reset means having a first portion thereof engageable with said release means and said locking pin for holding said locking pin out of said aperture until said latch means rotates said latch plate and thereafter allowing said locking pin to engage said latch plate in a position to accept said latch means when such folding ramp is once again raised;
 (d) a guide cylinder positioned around at least a portion of said locking pin; and
 (e) a biasing means disposed between a second end of said locking pin and an inner surface of an end cap disposed an outer end of said guide cylinder.

9. A latching mechanism, according to claim 8, wherein said release means is a handle.

10. A latching mechanism, according to claim 9, wherein said release handle and said reset means are formed as a single piece unit.

11. A latching mechanism, according to claim 8, wherein said reset means is an arm.

12. A latching mechanism, according to claim 11, wherein said reset arm includes a second portion extending substantially perpendicular to said first portion.

13. A latching mechanism, according to claim 11, wherein said tapered lower jaw includes a slot like portion for receiving a portion of said reset arm therein.

14. A latching mechanism, according to claim 8, wherein said guide cylinder includes a slot-like opening for guiding said reset arm and said release handle.

15. A latching mechanism, according to claim 14, wherein said guide cylinder slot-like opening includes a lateral notch for guiding said reset means and said release means.

16. A latching mechanism, according to claim 8, wherein said biasing means is a spring.

17. A latching mechanism, according to claim 3, wherein said opening formed in said latching head portion further includes a tapered upper jaw.

18. A latching mechanism, according to claim 1, wherein said latching mechanism further includes a positioning means disposed on such folding ramp and engageable with said latching mechanism for guiding said latching head portion into position to accept said latch means.

19. A latching mechanism, according to claim 1, wherein said rotatable latching member includes an opening for guiding and accepting said latch means.

20. A latching mechanism, according to claim 1, wherein said latching mechanism further includes a fulcrum pin about which said latching member rotates.

21. A latching mechanism, according to claim 1, wherein said latching mechanism further includes a tension spring attached at a first end thereof to said latching plate and at a second end thereof to said latching head.

\* \* \* \* \*